US009519925B2

(12) United States Patent
Crites (10) Patent No.: US 9,519,925 B2
(45) Date of Patent: Dec. 13, 2016

(54) DECENTRALIZED INTERNET SHOPPING MARKETPLACES

(71) Applicant: Richard R. Crites, Clearwater, FL (US)

(72) Inventor: Richard R. Crites, Clearwater, FL (US)

(73) Assignee: OmniBazaar, Inc.

( * ) Notice: Subject to any disclaimer, the term of this patent is extended or adjusted under 35 U.S.C. 154(b) by 779 days.

(21) Appl. No.: 13/956,358

(22) Filed: Aug. 1, 2013

(65) Prior Publication Data

US 2015/0039470 A1 Feb. 5, 2015

(51) Int. Cl.
*G06Q 30/06* (2012.01)
*G06Q 20/12* (2012.01)
*G06Q 20/22* (2012.01)

(52) U.S. Cl.
CPC .......... *G06Q 30/0623* (2013.01); *G06Q 20/12* (2013.01); *G06Q 20/223* (2013.01); *G06Q 30/06* (2013.01); *G06Q 30/0601* (2013.01); *G06Q 30/0641* (2013.01)

(58) Field of Classification Search
CPC ............ G06Q 30/0601; G06Q 30/0623; G06Q 30/0641
USPC ............................. 705/26.1, 26.61, 27.1, 75
See application file for complete search history.

(56) References Cited

U.S. PATENT DOCUMENTS

| 7,010,534 | B2 * | 3/2006 | Kraft | G06F 17/30206 |
| | | | | 705/26.8 |
| 7,958,019 | B2 * | 6/2011 | Ahmed | G06Q 30/0637 |
| | | | | 705/26.82 |
| 8,224,718 | B1 * | 7/2012 | Sholtis | G06Q 10/087 |
| | | | | 235/462.45 |
| 8,335,822 | B2 * | 12/2012 | Ahmed | G06Q 30/08 |
| | | | | 709/204 |

(Continued)

FOREIGN PATENT DOCUMENTS

WO WO-02/13093 A2 * 2/2002
WO WO-2010/002814 A3 * 1/2010

OTHER PUBLICATIONS

Anon., "Freenet: More Anarchy for the Internet," Dr. Dobb's Journal, 25.6 (Jun. 2000): 18.*

*Primary Examiner* — Nicholas D Rosen
(74) *Attorney, Agent, or Firm* — David E. Crites (57) ABSTRACT

A method, medium, and system are provided to facilitate local or global exchange of goods and services through a decentralized network of peer-to-peer (P2P) nodes. In one aspect of the disclosure, the nodes may be maintained or operated by the participants in the marketplace system. In one aspect, the system may operate on both desktop and mobile devices. In one aspect, the system operates with decentralized data storage. In one aspect, the system operates with a decentralized system of incentives for participation of nodes. In one aspect, the system operates with decentralized communication. In one aspect, the system (Continued)

operates with a decentralized system to escrow payments between participants. In one aspect, the system operates with a decentralized system of load balancing. In one aspect, the system operates with a decentralized system by which certain listings can be prioritized in the network. In one aspect, the system operates with decentralized transaction processing. In one aspect, the system operates with a decentralized digital currency as the medium of exchange between participants.

24 Claims, 1 Drawing Sheet

(56) References Cited

U.S. PATENT DOCUMENTS

| | | | | |
|---|---|---|---|---|
| 8,554,644 | B1* | 10/2013 | Sholtis | G06Q 10/087 235/462.45 |
| 8,949,338 | B2* | 2/2015 | Ahmed | G06Q 30/06 705/26.1 |
| 9,177,056 | B2* | 11/2015 | Zappacosta | G06F 17/30864 |
| 2002/0107748 | A1* | 8/2002 | Boies | G06Q 10/0637 705/26.3 |
| 2004/0098377 | A1* | 5/2004 | Kraft | G06F 17/30206 |
| 2007/0211651 | A1* | 9/2007 | Ahmed | G06Q 30/0637 370/256 |
| 2007/0214249 | A1* | 9/2007 | Ahmed | G06Q 30/06 709/223 |
| 2007/0214250 | A1* | 9/2007 | Ahmed | G06Q 30/08 709/223 |
| 2007/0250430 | A1* | 10/2007 | Sholtis | G06Q 30/0603 705/37 |
| 2008/0021835 | A1* | 1/2008 | Ginter | G06F 21/00 705/51 |
| 2009/0319354 | A1* | 12/2009 | Gonen | G06Q 20/26 705/14.23 |
| 2010/0174727 | A1* | 7/2010 | Zappacosta | G06Q 30/00 707/754 |
| 2011/0099037 | A1* | 4/2011 | Levin | G06Q 10/02 705/5 |
| 2012/0158553 | A1* | 6/2012 | Sudhidhanakul | G06Q 10/087 705/28 |
| 2013/0085842 | A1 | 4/2013 | Morales et al. | |
| 2013/0332290 | A1* | 12/2013 | Medrano | G06Q 30/02 705/14.73 |

\* cited by examiner

DECENTRALIZED INTERNET SHOPPING MARKETPLACES

FIELD OF TECHNOLOGY

The disclosure relates to electronic, digital and mobile commerce and in particular to digital and mobile commerce using a peer-to-peer network.

BACKGROUND

Historically, a marketplace has been characterized by a centralized geographic location or, on the Internet, by a centralize data-warehousing and transaction server. Users of centralized electronic commerce sites are usually dependent on, and subject to, the reliability, benevolence, regulations and privacy policies of the central transaction clearinghouse. Many of these electronic commerce sites collect personal data about the shopper, the shopper's interests, shopping habits, personal preferences, etc. These sites may then use that data to present unsolicited offers and advertisements for related products. Some shoppers object to these privacy intrusions.

A decentralized peer-to-peer digital marketplace can offer the user greater privacy, greater anonymity, better control of the shopping experience, a social shopping experience and a lack of intrusive unwanted advertising. A decentralized peer-to-peer digital marketplace may not be bound by the usual cost, liabilities and rules of location selection, infrastructure, traffic management, parking, inventory management, personnel, promotion etc. that are associated with a centralized marketplace.

SUMMARY

Disclosed herein is a decentralized digital peer-to-peer marketplace that facilitates transactions involving a plurality of content types. In one embodiment the nodes of the network are operated by the consumers and vendors who participate the marketplace. In various embodiments, the nodes of the network may operate with one or more of the following functions decentralized: content listing, data storage, transaction processing, node address tracking, communication, market incentives, escrow services, and with or without a decentralized digital currency.

In some embodiments the decentralized peer-to-peer digital marketplace may be scaleable because the number of nodes in the network may be expandable. In one embodiment, users may be offered incentives to participate in the storage and transmission of listings and network data, and for introducing new users to the network.

In addition to the types of transactions that normally occur in a centralized market, a decentralized peer-to-peer digital marketplace may also lend itself to local, personal, "one-off" transactions, for both new and used products. Such an informal, ad hoc marketplace also facilitates transactions for services (such as plumbers, dentists, attorneys, lawn care or massage), home-grown produce, local restaurants and food service providers (such as pizza or other "take-out" foods), close-outs, excess inventory, arts and crafts, and many other locally produced and consumed items.

In one aspect, a computer-based system supporting an internet-based peer-to-peer electronic marketplace, may include: a Listing Module that may prepare and publish listings to the peer-to-peer network; a Node Module that may maintain a list of available nodes, propagate listings to other nodes, receive listings from other nodes, assess the speed, dependability, general proximity and other characteristics of nodes; a Shopping Module that may find, filter, and present specific content of interest to the individual user; a Transaction Module that may facilitate and accomplish the digital transfer of funds between payors and payees, record a history of transactions, and manage the marketplace reputation of participants; an Escrow Module that may facilitate and manage escrow services; a Financial Module that may track users' available funds balances in various currencies, and enable incoming and outgoing transfers of digital funds to and from other digital currency accounts; a Social Module that may facilitate digital communication among users (e.g. participants of the peer-to-peer network); a Currency Exchange Module that may track and present exchange rates among digital and local currencies, and facilitate currency exchange transactions with other users; a Privacy Module to enhance the privacy of the user while accessing the peer-to-peer network; a Settings Module that may allow the user to specify or change settings, preferences, interests, favorites, account numbers for receiving digital currencies, personal and contact information, general or specific location information, listing fee amounts or percentages, and other user settings; and a User Interface Module that may present and coordinate other modules, allow users to view, filter and search product and service listings, easily indicate favorite and preferred product and service categories, vendors and specific products.

In some embodiments the computer-based system may be compatible with, and operate on, mobile devices such as smart phones and tablet computers, and any networked device. In some embodiments the computer-based system may be compatible with, and operate on, various computer operating systems and hardware platforms. In some embodiments the computer-based system may be compatible with, and operate on, multi-processor systems and distributed-processor systems.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

The various computing devices disclosed herein may include a variety of computer readable media. Computer readable media can be any available media that can be accessed by a computing device and includes both volatile and nonvolatile media, removable and non-removable media. By way of example, and not limitation, computer readable media may comprise computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by a computing device. Combinations of any of the above should also be included within the scope of computer readable media. Non-transitory computer-readable media comprise all computer-readable media except for a transitory, propagating signal.

The disclosed subject matter includes, in another aspect, the non-transitory computer-readable instructions which, when executed by a computer or mobile device, cause the computer or mobile device to connect to the digital peer-to-peer marketplace, download product and service listings, display listings to the user, execute transactions, pay other participants, accomplish currency exchange transactions, interact with others, create listings, adjust settings and preferences, interact with the user, and perform other steps of the peer-to-peer marketplace.

BRIEF DESCRIPTION OF THE DRAWING

The foregoing summary, as well as the following detailed descriptions, are better understood when read in conjunction with the appended drawing. For the purpose of illustrating the disclosure, there is shown in the drawing exemplary constructions of the invention; however, the invention is not limited to the specific methods and instrumentalities disclosed. In the drawing.

DETAILED DESCRIPTION

Figure 1:
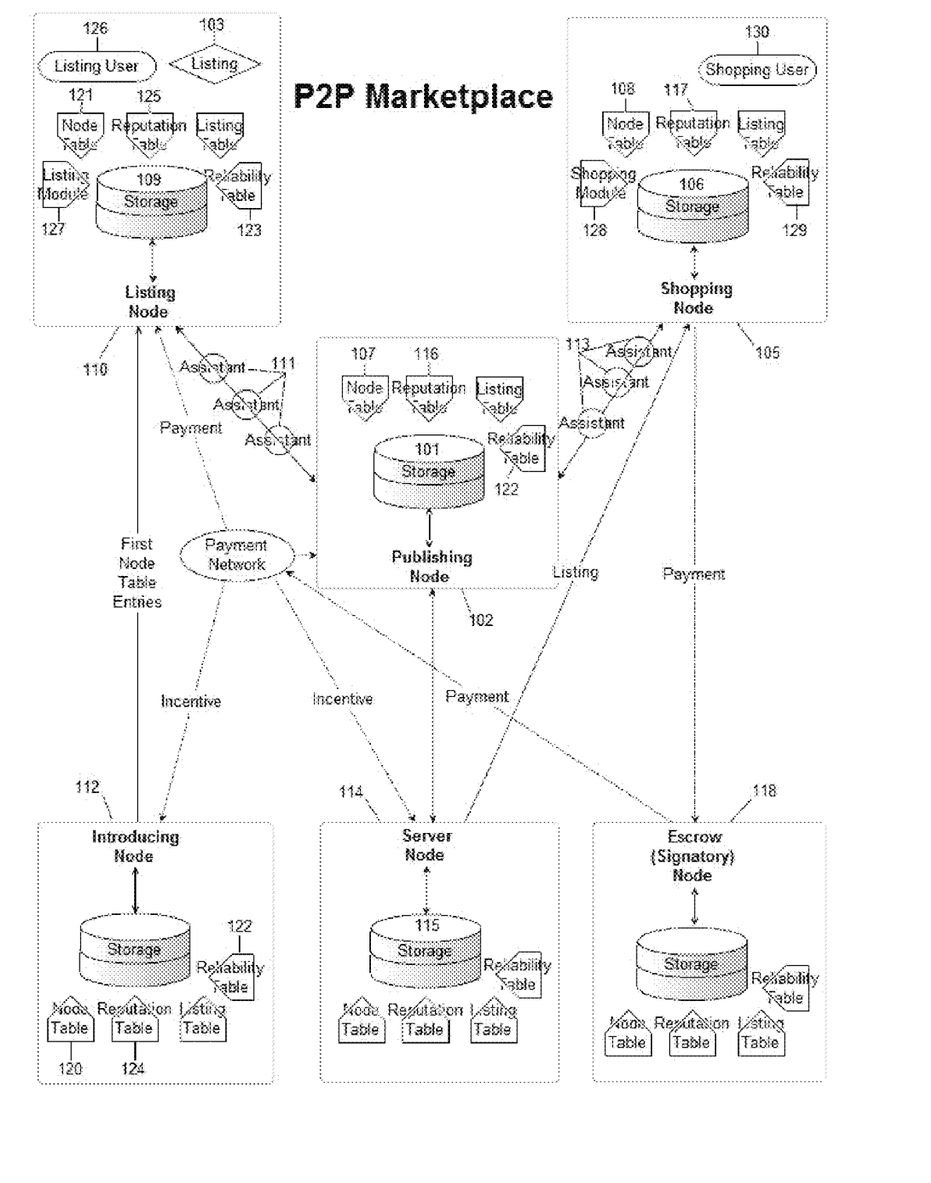
FIG. 1 shows a representative peer-to-peer network of nodes, in which some nodes may connect to all other nodes, while some other nodes may connect selectively to only some of the other nodes.

In an example embodiment, each node of the peer-to-peer network 102, 105, 110, 111, 112, 113, 114, 118 may have a unique network address for network communication purposes. In one embodiment, each node on the peer-to-peer network 102, 105, 110, 111, 112, 113, 114, 118 may have a node ID and node digital signature to identify the node cryptographically. In one embodiment, each market user 126, 130 may have a market ID and market digital signature to identify the user cryptographically. In one embodiment, node IDs and market IDs may be used for sending and receiving cryptographic payments.

In an example embodiment, each node (aka network node) 112 in the marketplace network may comprise a node table 120 that catalogs one or more nodes of the peer-to-peer network. In one embodiment, a new node 110 receives its node table 121 from an existing node 112 in the marketplace. In one embodiment, a new node 110 may add itself to its node table to catalog itself. In one embodiment, the node table entry of the new node 110 may be recorded by the existing node 112 from which the new node 110 receives its node table. In one embodiment one or more network addresses known to be existing nodes may be pre-populated in a node table 121 provided with the client software. In one embodiment, a node may offer, make available, or send its own node table entry or any one or more of its node table entries to the nodes cataloged its node table 121. In one embodiment, a node may offer, make available, or send its own node table entry or any one or more of its node table entries to any node of the marketplace network.

In one embodiment each entry in the node table 120 may comprise a network address. In one embodiment each entry in the node table 120 may comprise a node ID. In one embodiment each entry in the node table 120 may comprise at least one descriptor. In one embodiment the descriptor may catalog the role or roles that a node may accept in the marketplace. In one embodiment the roles may comprise: listing node, shopping node, assistant node, publishing node, server node, relay node, arbitrator node, escrow node, or other marketplace roles. In one embodiment a descriptor in the node table 120 may comprise a node digital signature so any client software may authenticate the node ID of the descriptor. In another embodiment each node in the peer-to-peer network may accept any role in the marketplace. In one embodiment a descriptor may catalog the listing types or listing categories or listing keywords that a node may accept or seek or offer in the marketplace. In one embodiment a descriptor may catalog one or more listing geographies that a node may accept or seek or offer in the marketplace. For example, the listing geography may indicate "North America", "Western US, "California", "415", "San Francisco", "Mission District", "94103", or another geographic category.

In an example embodiment, each node 112 in the marketplace network may comprise a reliability table 122 that catalogs reliability metrics for the nodes in the network. In one embodiment, a new node 110 may receive its reliability table 123 from an existing node 112 in the marketplace. In one embodiment, a new node 110 may begin with an empty reliability table 123. In one embodiment each entry in the reliability table 123 may comprise at least one of a rating market ID and a rating node ID; a reliability metric; and at least one of a rated network address and a rated node ID. In one embodiment each reliability metric in the reliability table 123 may be signed using a rating node digital signature or rating market digital signature so any client software may authenticate the rating node ID or rating market ID of each reliability metric.

In an example embodiment, each node 112 in the marketplace network may comprise a reputation table 124 that catalogs reputation metrics for the users or nodes in the network. In one embodiment, a new node 110 may receive its reputation table 125 from an existing node 112 in the marketplace. In one embodiment, a new node 110 may begin with an empty reputation table. In one embodiment, a reputation table may log one market user's assessment of another market user. In one embodiment, an assessment of a market user may be based on a marketplace listing, response to a listing, transaction, request, response to a request, or other marketplace interaction. In one embodiment each entry in the reputation table 125 may comprise at least one of a rating market ID and a rating node ID; a reputation metric; and at least one of a rated market ID and a rated node ID. In one embodiment each reputation metric in the reputation table 125 may be signed using a rating node digital signature or a rating market digital signature so any client software may authenticate the rating node ID or rating market ID of each reputation metric.

In an example embodiment, a listing user 126 may use at least one of the Listing Module 127, node table (aka listing node table) 121, reputation table (aka listing reputation table) 125, and reliability table (aka listing reliability table) 123 of a listing node to create a listing 103 and may store the listing in the storage 109 of the listing node 110. In an example embodiment, a listing user 126 may use at least one of the Listing Module 127, node table (aka listing node table) 121, reputation table (aka listing reputation table) 125, and reliability table (aka listing reliability table) 123 of a listing node 110 to publish a listing 103. In one embodiment, a listing may comprise an offer to sell or an offer to buy. In one embodiment, a listing may comprise an item description, a market ID (aka listing market ID) of the listing user, and a digital signature (aka listing digital signature) of the listing user 126. In one embodiment a listing may comprise one or more links to another listing, a web page, or a web resource. In one embodiment an item may be an object, service, idea, information, currency, or abstraction. In one embodiment, publishing the listing may comprise communicating the listing 103 to a publishing node 102 via the marketplace peer-to-peer network. In one embodiment, publishing the listing may comprise storing a copy of the listing 103 in the storage 101 of the publishing node 102. In one embodiment, publishing the listing may comprise offering, for storage, a copy of the listing 103 to one or more nodes in the publishing node table. In one embodiment, publishing the listing may comprise allowing other nodes of the marketplace network to copy the listing 103 to their storage. In one embodiment, publishing the listing 103 may comprise allowing other nodes of the marketplace network to search the one or more listings in storage on the publishing node in an effort to find a listing of interest. In one embodiment, publishing the listing may comprise incorporating the node address of the publishing node (aka publishing node address) into the listing. In one embodiment, publishing the listing may comprise incorporating a listing status of the listing into the listing. In one embodiment, publishing the listing may comprise offering a listing status update to one or more nodes in the publishing node table or allowing other nodes of the marketplace network to copy a listing status update. In one embodiment, a listing user 126 may create a listing 103 and publish the listing on the listing node 110. In this embodiment the listing node 110 is the publishing node 102 and the listing node table 121 is the publishing node table 107.

In one embodiment, a listing user 126 may create a listing 103 and publish the listing on a node 102 of the marketplace network that is not the listing node. In this embodiment the listing node 110 is not the publishing node 102 and the listing node table 121 is not the publishing node table 107. In one embodiment the Listing Module 127 may select from the listing node table 121 a publishing node 102 to publish the listing. In one embodiment, the Listing Module 127 may select a set of publishing-assistant nodes 111 from the listing node table 121 to assist with publishing the listing. In one embodiment the set of publishing-assistant nodes may be 1-10 nodes. In one embodiment, the publishing-assistant nodes 111 give the listing node some privacy by distancing the publication of the listing from the listing node 110. In one embodiment the Listing Module 127 may select more than one publishing node 102 in order to give the listing user 126 a measure of listing redundancy. In one embodiment the Listing Module 127 may select more than one set of publishing-assistant nodes 111 in order to give the listing user 126 a measure of listing redundancy. For example, if one of the publishing nodes 102 or one of the sets of publishing-assistant nodes 111 goes off-line a redundant publishing node 102 and a redundant set of publishing-assistant nodes 111 may still operate. In one embodiment, 1-5 sets of publishing-assistant nodes 111 are selected in order to afford the listing user 126 some redundancy from network uncertainties.

In one embodiment, the Listing Module 127 may use one or more publishing criteria to select the publishing nodes 102 from the nodes cataloged in the listing node table 121 (aka candidate nodes). In one embodiment, the Listing Module 127 may use one or more publishing-assistant criteria to select the set, and the redundant sets, of publishing-assistant nodes 111 from the nodes cataloged in the listing node table 121. In one embodiment, one of the publishing criteria or publishing-assistant criteria may be the descriptor of the candidate nodes. For example, a criterion may be to select one or more nodes having a publishing descriptor and one or more other nodes having an assistant descriptor. In one embodiment, one of the publishing criteria or publishing-assistant criteria may be a count of one or more entries cataloged in the remote node table 107 of one or more candidate nodes. In one embodiment, one of the publishing criteria or publishing-assistant criteria may be the number of entries with or without a certain descriptor cataloged in the remote node tables 107 of one or more candidate nodes. For example, the Listing Module 127 may request or receive the remote node table 107 of one or more nodes cataloged in the listing node table 121. In this example the Listing Module 127 may count a number of entries in the requested node table 107 and use that count as a criterion for selecting the publishing nodes 102 or the sets of publishing-assistant nodes 111. In this example the Listing Module 127 may count the number of entries in the requested node table 107 with or without a descriptor of "furniture" and use that count as a criterion for selecting the publishing nodes 102 or the sets of publishing-assistant nodes 111. In this example, the Listing Module 127 may also ping one or more entries in the requested node table 107 to verify their authenticity and adjust the total count to reflect an authentic count when no response is received from a ping. In this example, the authentic count may be computed or estimated using a statistical sampling or an exhaustive verification. In another example, a responding node 102 may provide an inquiring node 110 a count of the nodes in its responding node table 107. In this example, the Listing Module 127 of the inquiring node 110 may audit the provided node count, statistically or exhaustively, to determine or estimate an authentic count. In one embodiment, counting one or more entries cataloged in the node tables of the candidate nodes 102, 111 may allow selection of a publishing node with a high-count node table, well pruned node table, node table with a high/low count in a certain descriptor, or another objective; or may encourage node table sharing. In one embodiment, one of the criteria for selecting the publishing nodes 102 or the sets of publishing-assistant nodes 111 may be a reliability metric of one or more nodes in the listing reliability table 123. In one embodiment, one of the criteria for selecting the publishing nodes 102 or the sets of publishing-assistant nodes 111 may be a reputation metric of one or more nodes in the listing reputation table 125. In one embodiment, one of the criteria may be the network latency or jitter associated with the nodes in the listing node table 121. For example, the Listing Module 127 may test the latency or jitter associated with network communication with one or more nodes cataloged in the listing node table 121 and use the results as a publishing-assistant criterion or publishing criterion. In one embodiment, testing the network latency or jitter may help determine the relative proximity or communicative status of the candidate nodes. In one embodiment, one publishing-assistant criterion or publishing criterion may be a fee charged by the candidate nodes 102, 111. For example the descriptor in the listing node table 121 may comprise a fee charged for providing publishing service or a fee charged for providing assistant or publishing-assistant service. In one embodiment, one of the criteria for selecting the publishing nodes 102 or the sets of publishing-assistant nodes 111 may be a count of one or more listings published by the candidate nodes 102, 111. In this example the Listing Module 127 may count the number of entries in the requested node table 107 with or without a descriptor of "furniture" and use that count as a criterion for selecting the publishing nodes 102 or the sets of publishing-assistant nodes 111. In one embodiment, counting one or more listings published by the candidate nodes 102, 111 may allow selection of a publishing node with similar listings, available publishing capacity, publishing popularity, or another objective. In one embodiment another publishing-assistant criterion or publishing criterion may be one of: a physical location of the node, a start date of the node, a reliability or reputation metric of the node, an uptime metric of the node, nodes previously used, a random selection, and another node selection criterion.

In an example embodiment, when the publishing nodes 102 have been selected the Listing Module 127 may create an incentive message to one or more of the publishing nodes 102 selected. In an example embodiment, when the sets of publishing-assistant nodes 111 have been selected the Listing Module 127 may create an incentive message to one or more of the publishing-assistant nodes 111 selected. In one embodiment, an incentive message may comprise a commission, expressed as an amount or percentage, offered to the selected node 111. In another embodiment, an incentive message may comprise a potential-commission, expressed as an amount or percentage, conditionally offered to the selected node 111. In one embodiment, the condition of the offer may be a completed sale, a completed sale wherein the listing response must reach the listing node 110 via that publishing 102 or publishing-assistant node 111, a completed sale wherein the listing response must reach the listing node 110 first via that publishing 102 or publishing-assistant node 111, another communication condition, or another market condition. In one embodiment, an incentive message may comprise a zero commission or zero potential-commission. In one embodiment, an incentive message may comprise a node ID of the listing node 110. In one embodiment, an incentive message may comprise a market ID of the listing user 126.

In one embodiment, the Listing Module 127 may communicate with a first selected node to request that the node act as a publishing-assistant node 111 for publishing a listing. In one embodiment, an incentive message may be sent together with the request that the node act as a publishing-assistant node 111. In one embodiment, the communication with the first selected node 111 may be encrypted using the node ID of the first selected node. In one embodiment, the first selected node 111 may accept the request by establishing a shared secret with the Listing Module 127 to enable further secure communications. For example, the request that the node act as a publishing-assistant node 111 may comprise part of a Diffie-Hellman key exchange and the first selected node 111 may accept by completing the key exchange. In one embodiment, the first selected node 111 may respond to the request wherein the response is encrypted using the node ID of the listing node 110. In one embodiment, further secure communication between the two nodes may continue using asymmetric encryption. In one embodiment, when the first selected node 111 has accepted the request, and the set of publishing-assistant nodes 111 may comprise additional publishing-assistant nodes, the Listing Module 127 may communicate with a second selected node 111 to request that the second selected node act as a publishing-assistant node 111 for publishing a listing. In one embodiment, the communication with the second node 111 may be sent via the first selected node 111 using anonymous encrypted communication. For example, the communication with the second node 111 may be completed using Onion Routing. In one embodiment, when the last publishing-assistant node 102 has accepted the request, the Listing Module 127 may communicate with the last selected node 102 to request that the node act as a publishing node 102 for publishing a listing. In one embodiment, an incentive message may be sent together with the request that the node act as a publishing node 102. In one embodiment, an incentive message sent to the publishing node 102 may be different than an incentive message sent to a publishing-assistant node 111. In one embodiment, an incentive message sent to one publishing-assistant node 111 may be different than an incentive message sent to another publishing-assistant node. In one embodiment, the communication with the last selected node 102 may be sent via the preceding selected nodes 111 using anonymous encrypted communication. For example, the communication with the last selected node 102 may be completed using Onion Routing. In one embodiment, after a publishing node 102 accepts a listing it may publish the listing. In one embodiment, after a publishing node 102 accepts a listing it may wait a pseudo-random period of time and then publish the listing.

In an example embodiment, a shopping user 130 may use the Shopping Module 128, node table (aka shopping node table) 108, reputation table (aka shopping reputation table) 117, or reliability table (aka shopping reliability table) 129 of a shopping node 105 to search listings or select listings. In one embodiment, a shopping node 105 may search the listings that have been published by or copied to the shopping node 105. In one embodiment, a shopping node 105 may search the listings that have been published by one or more of the nodes cataloged in the shopping node table 108. In one embodiment, a shopping node 105 may search the listings that have been copied to the storage 115 of one or more nodes (aka server nodes 114) cataloged in the shopping node table 108. In one embodiment, a selected listing may be stored in a shopping non-transient storage 106 of the shopping node 105 if the listing meets a shopping criteria of the shopping user 130. In one embodiment, the shopping criteria may be a listing category, a listing geography, a listing status, a listing date, a listing keyword, or other search term. In one embodiment, a shopping node 105 may request the remote node table of a node of the peer-to-peer network and in this way add one or more nodes to the shopping node table 108. In one embodiment, a shopping node 105 may request the remote node table of a node of the peer-to-peer network and search the listings that have been published by one or more of the nodes cataloged in the remote node table. In one embodiment, a shopping node 105 may request the remote node table of a node of the peer-to-peer network and search the listings that have been copied to the storage 115 of one or more nodes (aka server nodes 114) cataloged in the remote node table.

In one embodiment, a shopping user 130 may choose a selected listing. In one embodiment, a shopping user 130 may generate a response to communicate to the publishing node 102. In one embodiment, a shopping user 130 may generate a response to communicate to the listing node 110. In one embodiment, a response to a selected listing may comprise the market ID of the shopping user (aka shopping market ID). In one embodiment, a response to a selected listing may comprise the digital signature of the shopping user (aka shopping digital signature). In one embodiment, a response to a selected listing may comprise a request for a more detailed listing, more information, or an answer to a question. In one embodiment, a response to a selected listing may comprise a bid or offer. In one embodiment, a response may be communicated directly to the publishing node 102. In one embodiment, a response may be communicated indirectly to the publishing node 102 in order to afford some privacy to the shopping user 130 or shopping node 105. In one embodiment, a response may be forwarded by the publishing node 102 to the listing node 110 using anonymous encrypted communication (e.g. 111).

In one embodiment the Shopping Module 128 may select a set of responding-assistant nodes 113 in order to communicate a response to a listing. In one embodiment the set of responding-assistant nodes 113 may be 1-5 nodes. In one embodiment the Shopping Module 128 may select one or more sets of responding-assistant nodes 113 in order to give the shopping user 130 (aka responding user) a measure of responding redundancy. In one embodiment, 1-5 sets of responding-assistant nodes 113 may be selected in order to afford the responding user 130 some redundancy from network uncertainties. In one embodiment, the Shopping Module 128 may use one or more responding-assistant criteria to select the sets of responding-assistant nodes 113 from the nodes cataloged in the shopping node table 108. In one embodiment, one of the responding-assistant criteria may be the number of entries cataloged in the remote node table of one or more node entries in the shopping node table 108. For example, one of the criteria may be to select one or more nodes 113 having an assistant descriptor. In one embodiment, one of the responding-assistant criteria may be a count of one or more entries found in the remote node table of one or more entries in the shopping node table 108 (aka candidate nodes). In one embodiment, one of the responding-assistant criteria may be a count of the entries with or without a certain descriptor cataloged in the remote node table of one or more candidate nodes. For example, the Shopping Module 128 may request or receive the remote node table of one or more nodes cataloged in the shopping node table 108. In this example the Shopping Module 128 may count a number of entries in the requested node table and use that count as a criterion for selecting the sets of responding-assistant nodes 113. In this example the Shopping Module 128 may count the number of entries in the requested node table with or without a descriptor of "furniture" and use that count as a criterion for selecting the sets of responding-assistant nodes 113. In this example, the Shopping Module 128 may also ping one or more entries in the requested node table to verify their authenticity and adjust the total count to reflect an authentic count when no response is received from a ping. In this example, the authentic count may be computed or estimated using a statistical sampling or an exhaustive verification. In another example, a responding node 113 may provide an inquiring node 105 a count of the nodes in its responding node table. In this example, the Shopping Module 128 of the inquiring node 105 may audit the provided node count, statistically or exhaustively, to determine or estimate an authentic count. In one embodiment, one of the criteria for selecting the responding-assistant nodes 113 may be a reliability metric of the nodes in the shopping reliability table 129. In one embodiment, one of the criteria for selecting the responding-assistant nodes 113 may be a reputation metric of the nodes in the shopping reputation table 117. In one embodiment, one of the criteria may be the network latency or jitter associated with the nodes in the shopping node table 108. For example, the Shopping Module 128 may test the latency or jitter associated with network communication with one or more nodes cataloged in the shopping node table 108 and use the results as responding-assistant criteria. In one embodiment, one responding-assistant criterion may be a fee charged by the candidate nodes 113. For example the descriptor in the shopping node table 108 may comprise a fee charged for providing assistant or responding-assistant service. Other responding-assistant criterion may be a physical location of the node, a start date of the node, a reliability metric of the node, a reputation metric of the node, an uptime metric of the node, nodes previously used, or random selection.

In one embodiment, a response to a selected listing may comprise a network address or node ID of a marketplace node 114 on which the Shopping Module 128 found, or from which the Shopping Module 128 received, the selected listing. In one embodiment, a selected listing may comprise an incentive message to one or more of the nodes on which a Shopping Module 128 finds, or from which a Shopping Module 128 receives, the selected listing. In one embodiment, a response to a selected listing may comprise part of a Diffie-Hellman key exchange in order to enable further secure communication using symmetric key encryption. In one embodiment, a response to a selected listing may comprise an address of a marketplace node that has agreed to be an anonymous relay node for further secure communication. In one embodiment, a response to a selected listing may be encrypted using the market ID of the listing user 126. In one embodiment, a response to a selected listing may comprise a digital signature of the shopping user 130 (aka shopping user digital signature).

In one embodiment, the Shopping Module 128 may communicate with a first selected node 113 to request that the node act as a responding-assistant node 113 for responding to a listing. In one embodiment, an incentive message may be sent together with the request that the node act as a responding-assistant node 113. In one embodiment, the communication with the first selected node 113 may be encrypted using the node ID of the first selected node 113. In one embodiment, the first selected node 113 may accept the request by establishing a shared secret with the Shopping Module 128 to enable further secure communications. For example, the request that the node act as a responding-assistant node 113 may comprise part of a Diffie-Hellman key exchange and the first selected node 113 may accept by completing the key exchange. In one embodiment, the first selected node 113 may respond to the request with a message encrypted using the node ID of the shopping node 105. In one embodiment, further secure communication between the two nodes may use asymmetric encryption. In one embodiment, when the first selected node 113 has accepted the request, and the set of responding-assistant nodes 113 may comprise additional responding-assistant nodes 113, the Shopping Module may communicate with a second selected node 113 to request that the second selected node 113 act as a responding-assistant node 113 for responding to a listing. In one embodiment, the communication with the second node 113 may be sent via the first selected node 113 using anonymous encrypted communication. For example, the communication with the second node 113 may be completed using Onion Routing. In one embodiment, when the last responding-assistant node 113 has accepted the request, the Shopping Module may communicate with the publishing node 102 to request that the node accept a response to a listing. In one embodiment, the communication with the publishing node 102 may be sent via the responding-assistant nodes 113 using anonymous encrypted communication. For example, the communication with the publishing node 102 may be completed using Onion Routing. In one embodiment, after a publishing node 102 accepts a response it may forward the response to the listing node 110 using anonymous encrypted communication. In one embodiment, after a publishing node 102 or responding-assistant node 113 accepts a response it may wait a pseudo-random period of time and then forward the response using anonymous encrypted communication.

In an example embodiment, a payor market user may pay a payee market user for the item of a listing. In one embodiment, a commission may be paid by the payor market user or payee market user, to an account of one or more publishing nodes associated with the listing. In one embodiment, a commission may be paid by the payor market user or payee market user, to an account of any node from which the shopping node 105 received the listing. In one embodiment, a commission may be paid by the payor market user or payee market user, to an account of any node 114 accessed by the shopping node 105 as it searched for the listing. In one embodiment, the Listing Module 127 may verify a candidate node's eligibility for a commission by accessing the listing node table 121; accessing the listing reliability table 123; accessing the listing reputation table 125; offering a listing to the candidate node 114; accessing the node table of the candidate node 114; or accessing a node table, reliability table, or reputation table of any node of the peer-to-peer network. In one embodiment, a commission may be paid by the payor market user or payee market user, to an account of the introducing node 112 from which the listing node 110 or shopping node 105 received its first node table 121, 108. In one embodiment, a commission may be paid by the payor market user or payee market user, to an account of a plurality of introducing nodes; wherein the plurality may be comprised of a mother introducing node from which the listing node or shopping node received its first node table, a grandmother introducing node from which the mother introducing node received its first node table, and optionally any number of other introducing nodes stemming back in the ancestral line of the mother and grandmother introducing nodes.

In an example embodiment, the Listing Module 127 of the listing node 110 or publishing node 102 may update the status of a listing. In one embodiment, the Listing Module 127 may update the listing status of the listing stored in the non-transient storage 109, 101 of the listing node 110 or publishing node 102. In one embodiment, the Listing Module of the publishing node 102 may update the listing status of the listing stored in the non-transient storage 101 of the publishing node 102. In one embodiment, the Listing Module 127 of the listing node 110 may communicate with the publishing node 102 to update the listing status of the listing stored in the non-transient storage 101 of the publishing node 102. In one embodiment, the Listing Module 127 of the listing node 110 may, using anonymous encrypted communication, communicate with the publishing node 102 to update the listing status of the listing stored in the non-transient storage 101 of the publishing node 102. For example, the listing status may be new, active, modified, expired, sold, pending, persistent, escrow, available, unavailable, removed, delete, or another market status.

In an example embodiment, a listing user 126 or the Escrow Module of the listing node 110 may agree to use at least one escrow node 118 to complete a transaction regarding the item of the listing. In one embodiment, a shopping user 130 or the Escrow Module of the shopping node 105 may agree to use at least one escrow node 118 to complete a transaction regarding the item of the listing. In one embodiment a shopping user 130 or the Escrow Module of the shopping node 105 may propose at least one escrow node 118 to the listing user 126. In one embodiment a listing user 126 or the Escrow Module of the listing node 110 may propose at least one escrow node 118 to the shopping user 130. In one embodiment a shopping user 130 or the Escrow Module of the shopping node 105 may accept at least one escrow node 118 proposed by the listing user 126. In one embodiment a listing user 126 or the Escrow Module of the listing node 110 may accept at least one escrow node 118 proposed by the shopping user 130. In one embodiment a shopping user 130 or the Escrow Module of the shopping node 105 may consider a reputation table 117 or a reliability table 129 when proposing, accepting, or agreeing on an escrow node 118. In one embodiment a listing user 126 or the Escrow Module of the listing node 110 may consider a reputation table 125 or a reliability table 123 when proposing, accepting, or agreeing on an escrow node 118. In one embodiment the reputation table or the reliability table considered may be the reputation table or the reliability table of any node in the marketplace network.

In an example embodiment, a listing user 126 or the Escrow Module of the listing node 110 may agree with a shopping user 130 or the Escrow Module of the shopping node 105 to select at least one escrow node 118 to complete a transaction regarding the item of the listing. In one embodiment, the Transaction Module of the shopping node 105, the Transaction Module of the listing node 110, or both, may deposit to an escrow account of the escrow node 118 the conventional or digital funds to complete the transaction regarding the item of the listing. In one embodiment, the funds to complete the transaction are held in the escrow account until specific escrow criteria of one or more of the listing user 126, the listing Escrow Module, the shopping user 130, and the shopping Escrow Module are met. In one embodiment, the escrow criterion for release of funds from the escrow account may be notification of receipt of the item of the listing by at least one of the listing user 126 and the shopping user 130. In one embodiment the escrow criterion for release of funds from the escrow account may be the passage of a specific amount of time, the accomplishment of an agreed-upon objective, the outcome of an event, or another escrow criteria as agreed in advance between the listing user 126 or the listing Escrow Module, and the shopping user 130 or the shopping Escrow Module. In one embodiment, the funds in the escrow account may be returned to the listing or shopping (e.g. payor) user, or released to the listing or shopping (e.g. payee) user, based on the escrow criteria. In one embodiment, notification to the escrow node about the occurrence or non-occurrence of the escrow criterion or criteria may be initiated by the listing user 126, the listing Escrow Module, the shopping user 130, the shopping Escrow Module, from another source agreed-upon by the listing user 126 and the shopping user 130, or may be calculated by the Escrow Module of the escrow node 118. In one embodiment, notification about the occurrence or non-occurrence of the escrow criterion or criteria for completion of a transaction regarding the item of a listing may be received and acted upon by the escrow user, or automatically by the Escrow Module of the escrow node 118. In one embodiment, approval of the escrow node may be required to pay any portion of the funds in the escrow account to a recipient.

In an example embodiment, a listing user 126 or the Escrow Module of the listing node 110 may select at least one escrow node 118 to complete a transaction regarding the item of the listing. In one embodiment, a shopping user 130 or the Escrow Module of the shopping node 105 may select at least one escrow node 118 to complete a transaction regarding the item of the listing. In one embodiment, at least one of a listing node 110, a shopping node 105, and one or more escrow nodes 118 may create a digital currency escrow account having a distributed key wherein the listing node 110, the shopping node 105, and the one or more escrow nodes 118 are holders of a share of the key for the account and may provide a digital signature to authorize or partially-authorize a payment from the account. In one embodiment, at least one of a listing node 110, a shopping node 105, and one or more escrow nodes 118 may use distributed key generation to create a digital currency escrow account having a distributed key wherein the at least one of the listing node 110, the shopping node 105, and the one or more escrow nodes 118 are holders of a share of the key for the account and may provide a digital signature to authorize or partially-authorize a payment from the account. In one embodiment, at least one of a listing node 110, a shopping node 105, one or more escrow nodes selected by the listing node 110, and one or more escrow nodes selected by the shopping node 105 may use distributed key generation to create a digital currency escrow account having a distributed key wherein the at least one of the listing node 110, the shopping node 105, the one or more escrow nodes selected by the listing node 110, and the one or more escrow nodes selected by the shopping node 105 are holders of a share of the key for the account and may provide a digital signature to authorize or partially-authorize a payment from the account. In one embodiment, at least one of a listing node 110, a shopping node 105, an escrow node selected by the listing node 110, and an escrow node selected by the shopping node 105 may use distributed key generation to create a digital currency escrow account having a distributed key wherein the at least one of the listing node 110, the shopping node 105, the escrow node selected by the listing node 110, and the escrow node selected by the shopping node 105 are each holders of a share of the key for the account and may provide a digital signature to partially-authorize a payment from the account. In one embodiment, a plurality of digital signatures may be necessary to authorize a payment from the account. In one embodiment, two or three digital signatures may be necessary to authorize a payment from the account.

In an example embodiment, a payor market user may pay a payee market user with a peer-to-peer digital currency (e.g. Bitcoin). In this example, some peer-to-peer digital currencies may allow the owner of a coin to improperly spend the coin a second time if the second spending occurs while the peer-to-peer currency network is still executing a first spending of the coin. In one embodiment, a service provider may offer a currency-signatory service such that it may be difficult for a market user to spend a digital currency more than once. In one embodiment, a trusted market node may provide a currency-signatory service by enabling a payor market user to hold currency in an account such that at least two secrets are necessary to make a payment from the account. In one embodiment, a payor market user may pay a payee market user from a digital currency account with a payment signed with a first digital signature, and a signatory service provider may sign the payment using a second digital signature provided that it is safe to do so, wherein both signatures are necessary to approve and execute the payment. In one example, the payor market user may hold a first secret needed to generate a first digital signature to partially-approve a payment, and the currency-signatory service provider may hold a second secret needed to generate a second digital signature to partially-approve the payment, such that when both digital signatures are provided the payment may be fully approved. In this example, only when a payment is signed with both the first digital signature and the second digital signature is the payment sufficiently signed, and only when the payment is sufficiently signed is the payment executed. In this example, distributed key generation may be used to generate the two secrets such that the two secrets may be separately held by the two different parties (i.e. the payor market user and the signatory service provider). In one embodiment, a payor market user may pay a payee market user from a digital currency account with a payment initiated using a first secret, and a signatory service provider may issue and sign the payment using a second secret provided that it is safe to do so. In one example, the payor market user may hold a first secret needed to initiate a payment, and the currency-signatory service provider may hold a second secret needed to issue and approve the payment, such that both secrets are necessary to initiate, issue, and approve the payment. In this example, a payor market user may initiate a payment to a payee market user from a digital currency account by entering on a machine of the signatory service a first secret, a payment amount, and a payee. In this example, the machine or the signatory service may then, if it is safe to do so, issue and sign the payment using a second secret to generate a digital signature to approve the payment. In this example one digital signature may be sufficient to approve and execute a payment that has been initiated using a separate secret. In one embodiment "it is safe to do so" may mean that any prior payment from the digital currency account is no longer pending, is sufficiently processed, or has had time to be executed by the peer-to-peer market network or peer-to-peer currency network. In one embodiment, "it is safe to do so" may mean that the balance of the digital currency account is sufficient to pay the payment plus any pending payments from the digital currency account that have not been fully executed by the peer-to-peer market network or peer-to-peer currency network. In one embodiment, a user holding a first secret may enable or disable the signatory service as an extra security measure. In one embodiment, a fraud alert of the signatory service may alert a user if a payment is initiated from their account (aka digital currency account) while the signatory service is disabled. In one embodiment, the payor market user, the payee market user, the trusted market node, and the signatory service provider may be any payor, payee, node, and service provider on a network of any peer-to-peer digital currency. In one embodiment, a method, an executable program stored on a computer-readable medium, or a processor may perform the steps of: receiving a current digital currency payment having a payor account and a payor secret; checking whether a one or more prior digital currency payments having the payor account are pending execution by a peer-to-peer network; signing the current digital payment with a signatory secret when it is safe to do so, wherein the payor secret and the signatory secret are both required to execute the current digital payment by the peer-to-peer network. In one embodiment, a signatory service may sign the current digital payment with a signatory digital signature when the payor account has a sufficient balance to pay both the prior digital currency payments and the current digital currency payment. In one embodiment, a signatory service may decline to sign the current digital payment with a signatory digital signature when the payor account has an insufficient balance to pay both the prior digital currency payment and the current digital currency payment. In one embodiment, a secret may be a private key or digital signature. In one embodiment, a secret may be a password.

The scope the present invention is not limited to the embodiments disclosed herein. For example, the foregoing disclosure uses explanatory terms, including capitalized terms such as Listing Module, Shopping Module, Transaction Module, Escrow Module, Settings Module, Privacy Module, and the like, which should by no means be construed so as to limit the scope of protection of the following claims, or to otherwise imply that the inventive aspects of the illustrative embodiments are limited to the particular methods and apparatus disclosed. Moreover, as will be understood by those skilled in the art, many of the inventive aspects disclosed herein may be applied using Internet protocols, networks, and communication techniques not incorporated in embodiments discussed herein. In many cases, the place of implementation (i.e., the functional element) described herein is merely a designer's preference and not a hard requirement. Accordingly, except as they may be expressly so limited, the scope of protection of the claims is not intended to be limited to the specific embodiments described above. Furthermore, as used in this disclosure the conjunction "or" may be inclusive or exclusive.

The invention claimed is:

1. A method of an electronic marketplace comprising the steps of:
   storing in a publishing non-transient storage, by a publishing network node, a listing of a listing user wherein the listing comprises: an item description, and a listing market ID associated with the listing user, and a listing digital signature of the listing user;
   amending the listing with a node address of the publishing network node and a listing status;
   communicating, by a peer-to-peer network, the listing from the publishing network node to a shopping network node;
   storing the listing in a shopping non-transient storage of the shopping network node if the listing meets a shopping criterion of a shopping user; and
   sending, by the peer-to-peer network, a listing response from the shopping user to the publishing network node, wherein the listing response comprises a shopping market ID associated with the shopping user, and a shopping digital signature of the shopping user.

2. The method of claim 1, wherein the publishing network node comprises a publishing node table that catalogs a first plurality of network addresses of the peer-to-peer network, and the shopping network node comprises a shopping node table that catalogs a second plurality of network addresses of the peer-to-peer network.

3. The method of claim 2 further comprising the steps of:
   storing the listing in a listing non-transient storage of a listing network node;
   selecting the publishing network node after considering at least one of: a publishing network node descriptor cataloged in a listing node table, a publishing network node latency or jitter, a publishing network node physical location, a publishing network node start date, a publishing network node reliability metric, a publishing network node uptime metric, a publishing network node previous use, a publishing network node random selection, a publishing network node reputation metric, a first count of one or more listings published by the publishing network node, and a second count of one or more node entries in the publishing node table; and
   communicating, by the peer-to-peer network, the listing from the listing network node to the publishing network node.

4. The method of claim 3, wherein the step of communicating the listing from the listing network node to the publishing network node further comprises:
   selecting a publishing-assistant node after considering at least one of: a publishing-assistant node descriptor, a publishing-assistant node network latency or jitter, a publishing-assistant node physical location, a publishing-assistant node start date, a publishing-assistant node reliability metric, a publishing-assistant node uptime metric, a publishing-assistant node previous use, a publishing-assistant node random selection, a publishing-assistant reputation metric, and a third count of one or more node entries in a publishing-assistant node table of the publishing-assistant node;
   communicating the listing from the listing network node, to the publishing network node, through the publishing-assistant node using anonymous encrypted communication; and
   waiting for a pseudo-random period of time.

5. The method of claim 3, further comprising the step of:
   paying a portion of a transaction resulting from the listing to an account of an existing node from which the listing network node received its first node table.

6. The method of claim 1, wherein the step of sending further comprises:
   selecting a responding-assistant node after considering at least one of: a responding-assistant node descriptor, a responding-assistant node network latency or jitter, a responding-assistant node physical location, a responding-assistant node start date, a responding-assistant node reliability metric, a responding-assistant node uptime metric, a responding-assistant node previous use, a responding-assistant node random selection, a responding-assistant node reputation metric, and a fourth count of one or more node entries in a responding-assistant node table of the responding-assistant node; and
   sending the listing response from the shopping network node, to the publishing network node, through the responding-assistant node using anonymous encrypted communication.

7. The method of claim 1, further comprising the step of:
   paying a portion of a transaction resulting from the listing to an account of the publishing network node.

8. The method of claim 1, wherein the step of communicating the listing from the publishing network node to the shopping network node further comprises:
   communicating the listing from the publishing network node to a server network node;
   storing the listing in a server non-transient storage of the server network node; and
   communicating the listing from the server network node to the shopping network node.

9. The method of claim 8, further comprising the step of:
   paying a portion of a transaction resulting from the listing to an account of the server network node.

10. The method of claim 1, wherein the listing further comprises a price, wherein the price is expressed in one of: a centrally issued currency, a government currency, and a digital currency.

11. The method of claim 1, wherein the publishing network node comprises a publishing reputation table that catalogs a third plurality of node reputation metrics of the peer-to-peer network, and the shopping network node comprises a shopping reputation table that catalogs a fourth plurality of reputation metrics of the peer-to-peer network.

12. The method of claim 1, further comprising the steps of:
   selecting at least one escrow node; and
   depositing funds from an account of at least one of the listing user and shopping user into an account of the escrow node wherein an approval of the escrow node is required to pay a portion of the funds to a recipient.

13. A non-transitory computer-readable storage medium with an executable program stored thereon, wherein the program instructs a processor to perform the steps of:
    storing in a publishing non-transient storage, by a publishing network node, a listing of a listing user wherein the listing comprises: an item description, a listing market ID associated with the listing user, and a listing digital signature of the listing user;
    amending the listing with a node address of the publishing network node and a listing status;
    communicating, by a peer-to-peer network, the listing from the publishing network node to a shopping network node;
    storing the listing in a shopping non-transient storage of the shopping network node if the listing meets a shopping criterion of a shopping user; and
    sending, by the peer-to-peer network, a listing response from the shopping user to the publishing network node, wherein the listing response comprises a shopping market ID associated with the shopping user, and a shopping digital signature of the shopping user.

14. The medium of claim 13, wherein the publishing network node comprises a publishing node table that catalogs a first plurality of network addresses of the peer-to-peer network, and the shopping network node comprises a shopping node table that catalogs a second plurality of network addresses of the peer-to-peer network.

15. The medium of claim 14, wherein the program further instructs the processor to perform the steps of:
    storing the listing in a listing non-transient storage of a listing network node;
    selecting the publishing network node after considering at least one of: a publishing network node descriptor cataloged in a listing node table, a publishing network node latency or jitter, a publishing network node physical location, a publishing network node start date, a publishing network node reliability metric, a publishing network node uptime metric, a publishing network node previous use, a publishing network node random selection, a publishing network node reputation metric, a first count of one or more listings published by the publishing network node, and a second count of one or more node entries in the publishing node table; and
    communicating, by the peer-to-peer network, the listing from the listing network node to the publishing network node.

16. The medium of claim 15, wherein the step of communicating the listing from the listing network node to the publishing network node further comprises:
    selecting a publishing-assistant node after considering at least one of: a publishing-assistant node descriptor, a publishing-assistant node network latency or jitter, a publishing-assistant node physical location, a publishing-assistant node start date, a publishing-assistant node reliability metric, a publishing-assistant node uptime metric, a publishing-assistant node previous use, a publishing-assistant node random selection, a publishing-assistant reputation metric, and a third count of one or more node entries in a publishing-assistant node table of the publishing-assistant node;
    communicating the listing from the listing network node, to the publishing network node, through the publishing-assistant node using anonymous encrypted communication; and
    waiting for a pseudo-random period of time.

17. The medium of claim 15, wherein the program further instructs the processor to perform the step of:
    paying a portion of a transaction resulting from the listing to an account of an existing node from which the listing network node received its first node table.

18. The medium of claim 13, wherein the step of sending further comprises:
    selecting a responding-assistant node after considering at least one of: a responding-assistant node descriptor, a responding-assistant node network latency or jitter, a responding-assistant node physical location, a responding-assistant node start date, a responding-assistant node reliability metric, a responding-assistant node uptime metric, a responding-assistant node previous use, a responding-assistant node random selection, a responding-assistant node reputation metric, and a fourth count of one or more node entries in a responding-assistant node table of the responding-assistant node; and
    sending the listing response from the shopping network node, to the publishing network node, through the responding-assistant node using anonymous encrypted communication.

19. The medium of claim 13, wherein the program further instructs the processor to perform the step of:
    paying a portion of a transaction resulting from the listing to an account of the publishing network node.

20. The medium of claim 13, wherein the step of communicating the listing from the publishing network node to the shopping network node further comprises:
    communicating the listing from the publishing network node to a server network node;
    storing the listing in a server non-transient storage of the server network node; and
    communicating the listing from the server network node to the shopping network node.

21. The medium of claim 20, wherein the program further instructs the processor to perform the step of:
    paying a portion of a transaction resulting from the listing to an account of the server network node.

22. The medium of claim 13, wherein the listing further comprises a price, wherein the price is expressed in one of: a centrally issued currency, a government currency, and a digital currency.

23. The medium of claim 13, wherein the publishing network node comprises a publishing reputation table that catalogs a third plurality of node reputation metrics of the peer-to-peer network, and the shopping network node comprises a shopping reputation table that catalogs a fourth plurality of reputation metrics of the peer-to-peer network.

24. The medium of claim 13, wherein the program further instructs the processor to perform the steps of:
    selecting at least one escrow node; and
    depositing funds from an account of at least one of the listing user and shopping user into an account of the escrow node wherein an approval of the escrow node is required to pay a portion of the funds to a recipient.

* * * * *